United States Patent Office 3,711,509
Patented Jan. 16, 1973

---

3,711,509
5-PHENYL-1H-1,5-BENZODIAZEPINE-2,4-(3H,5H)-DIONES
Karl-Heinz Weber, Gau-Algesheim, Karl Zeile and Peter Danneberg, Ingelheim am Rhein, Rolf Giesemann, Bingen, and Karl Heinz Hauptmann, deceased, late of Ingelheim am Rhein, Germany, by Maria Hauptmann, heir, Bonn (Rhine), Germany; said Weber, Zeile, Danneberg, and Giesemann assignors to Boehringer Ingelheim G.m.b.H., Ingelheim am Rhein, Germany
No Drawing. Continuation-in-part of application Ser. No. 89,482, Nov. 13, 1970, which is a continuation of application Ser. No. 703,188, Feb. 5, 1968, both now abandoned. This application Feb. 1, 1971, Ser. No. 111,715
Claims priority, application Germany, Feb. 7, 1967, B 91,071; Jan. 18, 1968, B 96,281, B 96,282
Int. Cl. C07d 53/04
U.S. Cl. 260—239.3 B    8 Claims

---

ABSTRACT OF THE DISCLOSURE

Compounds of the formula

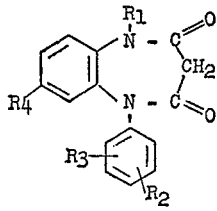

wherein $R_1$ is hydrogen, straight or branched alkyl of 1 to 5 carbon atoms, hydroxy-alkyl of 2 to 4 carbon atoms or di(alkyl of 1 to 4 carbon atoms) aminoalkyl of 2 to 4 carbon atoms,
$R_2$ is halogen, trifluoromethyl or methoxy,
$R_3$ is hydrogen, halogen, methyl or ethyl, and
$R_4$ is hydrogen, fluorine or chlorine;

the compounds are useful aspsychosedatives and anticonvulsives.

---

This is a continuation-in-part of copending application Ser. No. 89,482, filed Nov. 13, 1970, now abandoned, which in turn is a continuation of application Ser. No. 703,188, filed Feb. 5, 1968, now abandoned.

This invention relates to novel 5-phenyl-1H-1,5-benzodiazepine-2,4-(3H,5H)-diones and methods of preparing these compounds.

More particularly, the present invention relates to compounds of the formula

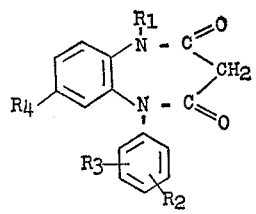

(I)

wherein $R_1$ is hydrogen, straight or branched alkyl of 1 to 5 carbon atoms, hydroxy-alkyl of 2 to 4 carbon atoms or di(alkyl of 1 to 4 carbon atoms) aminoalkyl of 2 to 4 carbon atoms,
$R_2$ is halogen, trifluoromethyl or methoxy,
$R_3$ is hydrogen, halogen, methyl or ethyl, and
$R_4$ is hydrogen, fluorine or chlorine.

The compounds according to the present invention may be prepared by a number of different methods involving well known chemical principles, among which the following have proved to be particularly convenient and efficient:

METHOD A

By cyclizing an N-phenyl-N-(2-amino-phenyl) amide of a lower alkyl malonate of the formula

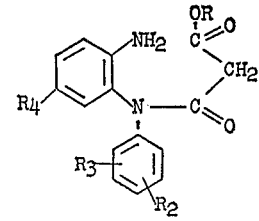

(II)

wherein R is lower alkyl and $R_2$, $R_3$ and $R_4$ have the same meanings as in Formula I, and, if desired, subsequently alkylating the cyclization product in the 1-position.

METHOD B

By cyclizing a 2-amino-diphenylamine of the formula

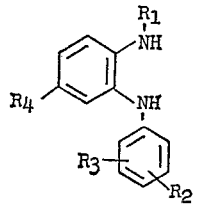

wherein $R_1$, $R_2$, $R_3$ and $R_4$ have the same meanings as in Formula I, with a malonic acid or alkylmalonic acid dihalide and, if desired, alkylating the cyclization product thus obtained in the 1-position.

In method A the hydrolysis and ring closure proceed smoothly and with good yields in an acid as well as an alkaline medium, preferably in the presence of an alcoholic or aqueous alcoholic solvent; however, other inert solvents such as tetrahydrofuran or dioxan are also suitable; for acid cyclization, acetonitrile may also be used as the solvent. Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The preferred reaction temperatures are preferably between +20° C. and the boiling point of the solvent which is used.

The preparation of an end product of the Formula I, wherein $R_1$ is unsubstituted or hydroxy-substituted alkyl, may be carried out in various ways. One may, for instance, start from a compound of Formula I wherein $R_1$ is hydrogen and exchange the same for an alkyl group with the aid of a customary alkylating agent, such as an alkyl halide or an alkyl sulfate, such as a dialkylsulfate. For this purpose an alkali metal salt of a compound of Formula I is dissolved or suspended in a suitable solvent, the alkylating agent is added to the solution or suspension, and the reaction mixture is heated. For the preparation of an end product of the Formula I wherein $R_1$ is hydroxyalkyl, a compound of the Formula I wherein $R_1$ is hydrogen may be reacted with an alkyleneoxide in the presence of a strong base, such as Triton-B. If the cyclization is carried out under alkaline conditions, the alkylation of the 1-position may also be effected after the cyclization is finished, without prior isolation of the 1-unsubstituted benzodiazepine-2,4-dione cyclization product. In this case the alkylating agent is added to the cyclization reaction solution containing the cyclization product, and the mixture heated.

In method B the reaction is preferably carried out in the presence of a suitable inert organic solvent, such as benzene, toluene, xylene, tetrahydrofuran, dioxane or dimethylformamide, at room temperature or, more advantageously, at the boiling point of the particular solvent which is used. In some cases the addition of a tertiary organic base, such as pyridine, has proved to have a favorable influence upon the course of the reaction. An end product of the Formula I, wherein $R_1$ is hydrogen, may optionally be subsequently alkylated, as described in conjunction with method A.

The N-phenyl-N-(2-amino-phenyl)-malonic acid lower alkyl ester amides of the Formula II used as starting materials for method A are also novel. They may be prepared by reacting a correspondingly substituted N-phenyl-N-(2-nitro-phenyl)-amine with a malonic acid monoalkyl ester halide to obtain an N-phenyl-N-(2-nitro-phenyl)-malonic acid alkyl ester amide, and subsequently reducing the nitro group according to the following reaction sequence:

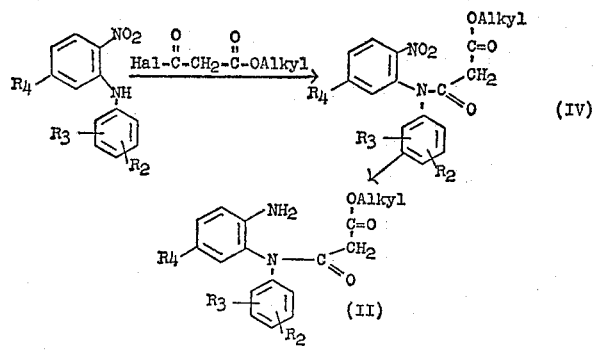

wherein $R_2$, $R_3$ and $R_4$ have the same meanings as in Formula I.

Thus, the preparation of an N-phenyl-N-(2-nitrophenyl)-malonic acid alkyl ester amide of the Formula IV is carried out, for example, by heating a solution of N-phenyl-N-(2-nitro-phenyl)-amine in a suitable solvent, such as benzene, toluene or xylene, with a malonic acid alkyl ester halide, whereby the nitro compound IV is always obtained with good yields (80%) and in crystalline form.

The subsequent reduction of compound IV may be effected by nascent or catalytic hydrogenation, for example by hydrogenation with Raney-nickel or with a mixture of iron and glacial acetic acid.

For the cyclization to form the 5-phenyl-1H-1,5-benzodiazepine-2,4-(3H,5H)-dione end product of the Formula I it is not absolutely necessary to start from an isolated compound of the Formula II; instead, the solution containing the hydrogenated intermediate product II may directly be treated with the cyclization agents mentioned above, after removal of the catalyst.

The starting compounds of the Formula III wherein $R_1$ is hydrogen may be prepared by conventional methods, for example, by catalytic reduction of the corresponding 2-nitro-diphenylamine. Starting compounds of the Formula III wherein $R_1$ is alkyl may be obtained analogous to the method described in Chem. Berichte, Volume 34, page 4204 (1902), and Volume 37, page 552 (1904), that is, by cyclizing a 2-aminodiphenylamine with formic acid, alkylating at the nitrogen atom in the cyclization product by means of an alkyl iodide, and subsequently splitting the ring with an alkali.

The following examples further illustrate the present invention and will enable others skilled in the art to understand it more completely. It should be understood, however, that the invention is not limited solely to the particular examples given below.

Example 1

5 - (4' - methoxy-phenyl)-1H-1,5-benzodiazepine-2,4-(3H,5H)-dione by method A.—71 gm. of the N-(p-methoxy-phenyl)-N-(o-nitro-phenyl)-amide of ethyl malonate (an oil) were dissolved in about 400 ml. of methanol, and the resulting solution was hydrogenated at room temperature and 6 atmospheres gauge in the presence of Raney nickel until the calculated amount of hydrogen had been absorbed. Thereafter, the catalyst was separated by vacuum filtration, the filtrate was concentrated by evaporation to about 200 ml., then 8 ml. of concentrated hydrochloric acid and 150 ml. of water were added, and the mixture was allowed to stand at room temperature for four days. Subsequently, the precipitate formed during that time was collected by vacuum filtration, 30 gm. (54% of theory) of the compound of the formula

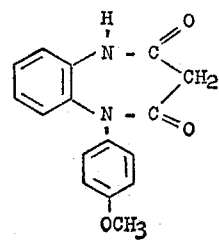

having a melting point of 286–290° C. were obtained.

The starting compound was prepared in the following manner:

100 gm. of N-(p-methoxy-phenyl)-N-(o-nitro-phenyl)-amine and 71 gm. of malonic acid ethyl ester chloride were dissolved in 500 ml. of benzene, and the solution was refluxed for 15 hours. Thereafter, the reaction solution was washed with aqueous sodium bicarbonate and then with water, and the benzene was evaporated therefrom in vacuo. The oily residue consisted of 71 gm. of the N-(p-methoxy-phenyl)-N-(o-nitro-phenyl)-amide of ethyl malonate, which were utilized without further purification.

Example 2

1-methyl - 5 - (4'-methoxy-phenyl)-1H,1,5-benzodiazepine-2,4-(3H,5H)-dione by method A.—5 gm. of 5-(4'-methoxy-phenyl)-1H-1,5-benzodiazepine - 2,4 - (3H,5H)-dione were dissolved in 250 ml. of dioxane, and 1.5 gm. of sodium amide were added to the solution. The mixture was heated for three hours at 60° C., whereby a clear solution was formed, 5 ml. of methyl iodide were added, and the mixture was heated for six hours more at 70° C. Thereafter, a small amount of methanol was added, the solution was evaporated in vacuo, the residue was taken up in water, the aqueous solution was extracted with methylene chloride, the extract solution was evaporated, and the residue was recrystallized from ethyl acetate, yielding 3.4 gm. of the compound of the formula

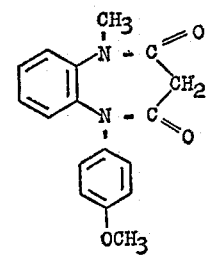

having a melting point of 175° C.

Example 3

Using a procedure analogous to that described in Example 1, 5 - (3' - methyl-phenyl)-1H-1,5-benzodiazepine- 2,4-(3H,5H)-dione, M.P. 295–297° C., was prepared from the N-(2-methoxy-phenyl)-N-(2'-nitro-phenyl)-amide of ethyl malonate.

Example 4

Using a procedure analogous to that described in Example 1, 5-(3'-methyl-phenyl)-1H-1,5-benzodiazenpine-2,4-(3H,5H)-dione, M.P. 213° C., was prepared from the N-(3-methoxy-phenyl)-N-(2'-nitro-phenyl)-amide of ethyl malonate.

Example 5

Using a procedure analogous to that described in Example 1, 5-(2'-methoxy-phenyl)-7-chloro-1H-1,5-benzodiazepine-2,4-(3H,5H)-dione, M.P. 281° C., of the formua

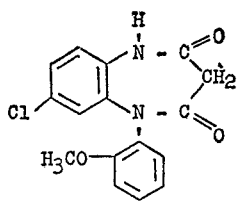

was prepared from the N-(2-methoxy-phenyl)-N-(2'-nitro-5'-chloro-phenyl)-amide of ethyl malonate.

Example 6

Using a procedure analogous to that described in Example 1, 5 - (3' - chloro-phenyl)-7-chloro-1H-1,5-benzodiazepine - 2,4 - (3H,5H - dione, M.P. 256° C., of the formula

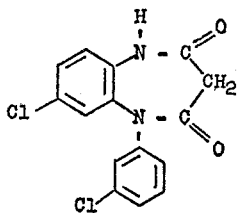

was prepared from the N-(3-chloro-phenyl)-N-(2'-nitro-5'-chloro-phenyl)amide of ethyl malonate.

Example 7

Using a procedure analogous to that described in Example 2, 1-methyl-5-(2'-methoxy-phenyl)-1H-1,5-benzodiazepine-2,4-(3H,5H)dione, M.P. 205° C., of the formula

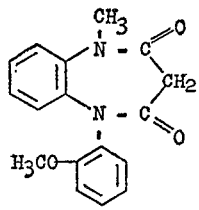

was prepared from 5-(2'-methoxy-phenyl)-1H-1,5-benzodiazepine-2,4-(3H,5H)-dione and methyl iodide.

Example 8

Using a procedure analogous to that described in Example 2, 1-methyl-5-(3'-methoxy-phenyl)-1H-1,5-benzodiazepine-2,4-(3H,5H)-dione, M.P. 127° C., was prepared from 5-(3'-methoxy-phenyl)-1H-1,5-benzodiazepine - 2,4-(3H,5H)-dione and methyl iodide.

Example 9

Using a precedure analogous to that described in Example 2, 1 - ethyl-5-(2'-methoxy-phenyl)-1H-1,5 - benzodiazepine-2,4-(3H,5H)-dione, M.P. 194–195° C., of the formula

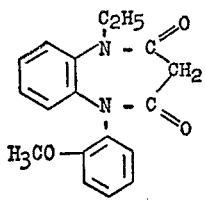

was prepared from 5-(2'-methoxy-phenyl)-1H-1,5-benzodiazepine-2,4-(3H,5H)-dione and ethyl iodide.

Example 10

Using a procedure analogous to that described in Example 2, 1-methyl-5-(3'-chloro-phenyl)-7-chloro-1H-1,5-benzodiazepine-2,4-(3,5H)-dione, M.P. 189–191° C., of the formula

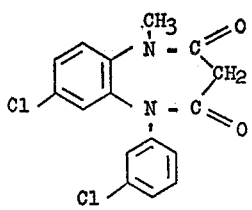

was prepared from 5-(3'-chloro-phenyl)-7-chloro-1H-1,5-benzodiazepine-2,4-(3H,5H)-dione and methyl iodide.

Example 11

Using a procedure analogous to that described in Example 1, 5-(4'-chlolo-phenyl)-1,H-1,5-benzodiazepine-2,4-(3H,5H)-dione, M.P. 245° C., of the formula

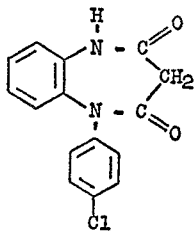

was prepared from the N-(4-chloro-phenyl)-N-(2'-nitrophenyl)-amide of ethyl malonate.

Example 12

Using a procedure analogous to that described in Example 1, 5 - (4'-chloro-phenyl)-7-chloro-1H-1,5-benzodiazepine-2,4-(3H,5H)-dione, M.P. 264–266° C., of the formula

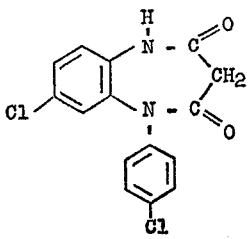

was prepared from the N-(4-chloro-phenyl)-N-(2'-nitro-5'-chloro-phenyl)-amide of ethyl malonate.

Example 13

Using a procedure analogous to that described in Example 2, 1-methyl-5-(4'-chloro-phenyl)-1H,1,5-benzodiazepine-2,4-(3H,5H)-dione, M.P. 190–192° C., of the formula

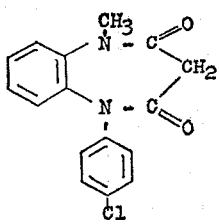

was prepared from 5-(4'-chloro-phenyl)-1H-1,5-benzo-diazepine-2,4-(3H-,5H)-dione and methyl iodide.

Example 14

Using a procedure analogous to that described in Example 1, 5-(2'-chloro-phenyl)-7-chloro-1H - 1,5 - benzodiazepine-2,4-(3H,5H)-dione, M.P. 263° C., was prepared from the N-(2-chloro-phenyl)-N-(2'-nitro - 5' - chloro-phenyl)-amide of ethyl malonate.

Example 15

Using a procedure analogous to that described in Example 1, 5-(2'-methyl-4'-chloro-phenyl)-1H - 1,5 - benzodiazepine-2,4-(3H,5H)-dione, M.P. 245° C., of the formula

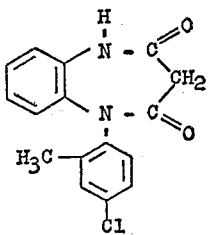

was prepared from the N-(2-methyl-4-chloro-phenyl)-N-(2'-nitro-phenyl)-amide of ethyl malonate.

Example 16

Using a procedure analogous to that described in Example 2, 1-ethyl-5-(2'-chloro-phenyl)-7-chloro-1H - 1,5-benzodiazepine-2,4-(3H,5H)-dione, M.P. 207–209° C., of the formula

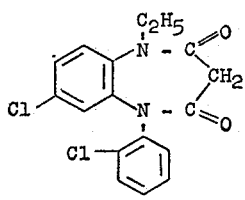

was prepared from 5-(2'-chloro-phenyl)-7-chloro-1H-1,5-benzodiazepine-2,4(3H,5H)-dione and ethyl iodide.

Example 17

Using a procedure analogous to that described in Example 2, 1-isopropyl-5-(2'-chloro-phenyl)-7-chloro-1H-1,5-benzodiazepine-2,4-(3H,5H)-dione, M.P. 215–217° C., of the formula

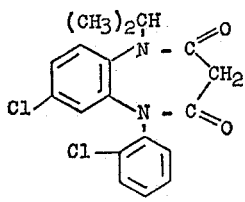

was prepared from 5-(2'-chloro-phenyl)-7-chloro-1H-1,5-benzodiazepine-2,4-(3H,5H)-dione and isopropyl iodide.

Example 18

Using a procedure analogous to that described in Example 1, 5-(2',4'-dichloro-phenyl)-7 - chloro - 1H - 1,5-benzodiazepine-2,4-(3H,5H)-dione, M.P. 282–284° C., of the formula

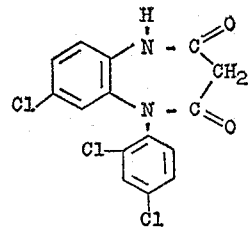

was prepared from the N-(2,4-dichloro-phenyl)-N-(2'-nitro-5'-chloro-phenyl)-amide of ethyl malonate.

Example 19

Using a procedure analogous to that described in Example 1, 5-(2'-fluoro-phenyl)-7-chloro-1H-1,5-benzodiazepine-2,4-(3H,5H)-dione, M.P. 255–257° C., of the formula

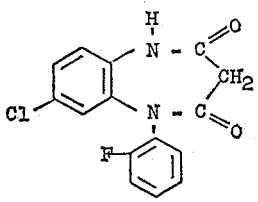

was prepared from the N-(2'-fluoro-phenyl)-N-(2'-nitro-5'-chloro-phenyl)-amide of ethyl malonate.

Example 20

Using a procedure analogous to that described in Example 2, 1-methyl-5-(2'-fluoro-phenyl)-7-chloro-1H - 1,5-benzodiazepine-2,4-(3H,5H)-dione, M.P. 153–154° C., of the formula

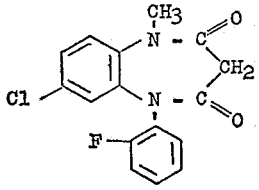

was prepared from 5-(2'-fluoro-phenyl)-7-chloro-1H-1,5-benzodiazepine-2,4-(3H,5H)-dione and methyl iodide.

Example 21

Using a procedure analogous to that described in Example 2, 1-methyl-5-(4'-chloro-phenyl)-7-chloro-1H-1,5-benzodiazepine-2,4-(3H,5H) - dione, M.P. 226–227° C., was prepared from 5-(4'-chloro-phenyl)-7-chloro-1H-1,5-benzodiazepine-2,4-(3H,5H)-dione and methyl iodide.

Example 22

Using a procedoure analogous to that described in Example 2, 1-methyl-5-(2'-chloro-phenyl)-7-chloro-1H - 1,5-benzodiazepine-2,4-(3H,5H) - dione, M.P. 222° C., was prepared from 5-(2'-chloro-phenyl)-7-chloro - 1H - 1,5-benzodiazepine-2,4-(3H,5H)-dione and methyl iodide.

Example 23

Using a procedure analogous to that described in Example 2, 1-methyl-5-(2'-chloro-4'-methyl - phenyl) - 7-chloro-1H-1,5-benzodiazepine-2,4-(3H,5H) - dione, M.P. 201–202° C., was prepared from 5-(2'-chloro-4'-methylphenyl)-7-chloro-1H-1,5-benzodiazepine - 2,4 - (3H,5H)-dione and methyl iodide.

Example 24

Using a procedure analogous to that described in Example 2, 1-(β-hydroxy-ethyl)-5-(2'-chloro - phenyl) - 7-chloro-1H-1,5-benzodiazepine-2,4-(3H,5H) - dione, M.P. 197–199° C., of the formula

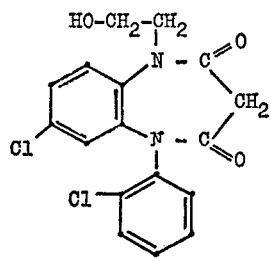

was prepared from 5-(2'-chloro-phenyl)-7-chloro-1H-1,5-benzodiazepine-2,4-(3H,5H)-dione and β-hydroxy - ethyl bromide.

Example 25

Using a procedure analogous to that described in Example 2, 1-(3'-hydroxy-n-propyl-2')-5-(2''-chlorophenyl)-7-chloro-1H-1,5-benzodiazepine-2,4-(3H,5H)-dione, M.P. 156–158° C., of the formula

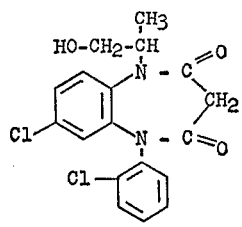

was prepared from 5-(2'-chloro-phenyl)-7-chloro-1H-1,5-benzodiazepine-2,4-(3H,5H)-dione and 1 - hydroxy - 2-bromo-propane.

Example 26

Using a procedure analogous to that described in Example 2, 1-methyl-5-(2'-bromo-phenyl)-7-fluoro-1H-1,5-benzodiazepine-2,4-(3H,5H)-dione, M.P. 190–192° C., of the formula

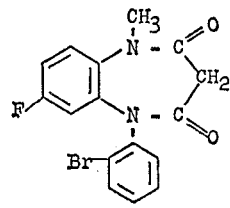

was prepared from 5(2'-bromo-phenyl)-7-fluoro-1H-1,5-benzodiazepine-2,4-(3H,5H)-dione and methyl iodide.

Example 27

Using a procedure analogous to that described in Example 2, 1-methyl-5-(2'-fluoro-phenyl)-7-chloro-1H-1,5-benzodiazepine-2,4-(3H,5H)-dione, M.P. 195–196° C., was prepared from 5-(2'-fluoro-phenyl)-7-chloro-1H-1,5-benzodiazepine-2,4-(3H,5H)-dione and methyl iodide.

Example 28

Using a procedure analogous to that described in Example 2, 1-(dimethylamino-ethyl)-5-(2'-fluoro-phenyl)-7-chloro-1H-1,5-benzodiazepine-2,4-(3H,5H) - dione, M.P. 134–136° C., of the formula

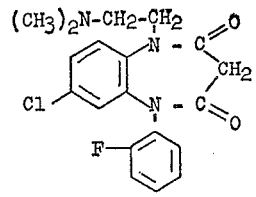

was prepared from 5-(2'-fluoro-phenyl)-7-chloro-1H-1,5-benzodiazepine-2,4-(3H,5H)-dione and 2-dimethylamino-ethyl chloride.

Example 29

Using a procedure analogous to that described in Example 2, 1-methyl-5-(2'-chloro-phenyl)-7-fluoro-1H-1,5-benzodiazepine-2,4-(3H,5H)-dione, M.P. 195–196° C., was prepared from 5-(2'-chloro-phenyl)-7-fluoro-1H-1,5-benzodiazepine-2,4-(3H,5H)-dione and methyl iodide.

Example 30

Using a procedure analogous to that described in Example 2, 1-methyl-5-(2'-fluoro-phenyl)-1H - 1,5 - benzodiazepine-2,4-(3H,5H)-dione, M.P. 162–163° C., was prepared from 5-(2'-fluoro-phenyl)-1H-1,5-benzodiazepine-2,4-(3H,5H)-dione and methyl iodide.

Example 31

Using a procedure analogous to that described in Example 1, 5 - (2' - bromo-phenyl)-7-chloro-1H-1,5-benzodiazepine-2,4-(3H,5H)-dione, M.P. 255–256° C., was prepared from the N-(2 - bromo-phenyl)-N-(2' - nitro - 5'-chloro-phenyl)-amide of ethyl malonate.

Example 32

Using a procedure analogous to that described in Example 2, 1-methyl-5-(3'-trifluoromethyl-phenyl)-7-chloro-1H-1,5-benzodiazepine-2,4 - (3H,5H) - dione, M.P. 192–195° C., of the formula

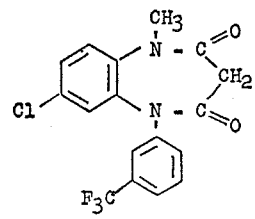

was prepared from 5-(3'-trifluoromethyl-phenyl)-7-chloro-1H-1,5-benzodiazepine-2,4-(3H,5H) - dione and methyl iodide.

Example 33

Using a procedure analogous to that described in Example 2, 1-methyl-5-(2'-trifluoromethyl-phenyl)-7-chloro-1H-1,5 - benzodiazepine - 2,4-(3H,5H)-dione M.P. 204–205° C., was prepared from 5-(2'-trifluoromethyl-phenyl)-7-chloro-1H-1,5-benzodiazepine-2,4 - (3H,5H)-dione and methyl iodide.

Example 34

Using a procedure analogous to that described in Example 2, 1 - methyl - 5-(2'-bromo-phenyl)-7-chloro-1H-1,5-benzodiazepine-2,4-(3H,5H)-dione, M.P. 210–212° C., was prepared from 5(2'-bromo-phenyl)-7-chloro-1H-1,5-benzodiazepine-2,4-(3H,5H)-dione and methyl iodide.

The compounds according to the present invention, that is, those embraced by Formula I above, have useful pharmacodynamic properties. More particularly, they exhibit very effective psychosedative (tranquilizing and anticonvulsive activities in warm-blooded animals, such as mice, rats and dogs, coupled with low toxicity.

Particularly effective are compounds of the Formula I wherein $R_1$ is methyl, ethyl or dimethylamino-ethyl, $R_2$ is chlorine, fluorine or trifluoromethyl in the 2-position of the phenyl substituent, $R_3$ is hydrogen and $R_4$ is chlorine.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 0.833 mgm./kg. body weight, preferably 0.0833 to 0.42 mgm./kg., and the daily dose rate is from 0.166 to 2.5 mgm./kg.

The following examples illustrate a few dosage unit compositions comprising a compound of the instant invention as an active ingredient and represent the best mode contemplated of putting the invention to practical use. The parts are parts by weight unless otherwise specified Example 35

Coated pills.—The pill core composition was compounded from the following ingredients:

| | Parts |
|---|---|
| 5 - (2' - chloro-phenyl) - 7 - chloro - 1H-1,5-benzodiazepine-2,4-(3H,5H)-dione | 10.0 |
| Lactose | 28.5 |
| Corn starch | 15.0 |
| Gelatin | 1.0 |
| Magnesium stearate | 0.5 |
| Total | 55.0 |

Compounding procedure.—The benzodiazepinedione compound was intimately admixed with the lactose and the corn starch, the mixture was moistened with an aqueous 10% solution of the gelatin, the moist mass was forced through a 1 mm.-mesh screen, and the granulate obtained thereby was dried at 40° C. and again passed through the screen. The dry granulate was admixed with the magnesium stearate, and the mixture was pressed into 55 mgm.-pill cores, which were subsequently coated with a thin shell with the aid of an aqueous suspension of sugar, talcum, titanium dioxide and gum arabic, and the coated pills were polished with beeswax. One coated pill contained 10 mgm. of the benzodiazepinedione compound and, when administered to a warm-blooded animal of about 60 kg. body weight in need of such treatment, produced very good tranquilizing and anticonvulsive effects.

The same results were obtained when the benzodiazepinedione compound in the above pill core composition was replaced by an equal amount of one of the following benzodiazepinediones:

(a) 1-methyl-5-(2'-chloro-phenyl)-7-chloro-1H-1,5-benzodiazepine-2,4-(3H,5H)-dione;
(b) 1-methyl-5,-(2'-trifluoromethyl-phenyl)-7-chloro-1H-1,5-benzodiazepine-2,4-(3H,5H)-dione;
(c) 1-methyl-5-(2'-fluoro-phenyl)-7-chloro-1H-1,5-benzodiazepine-2,4-(3H,5H)-dione; or
(d) 1-(dimethylamino-ethyl)-5-(2'-fluoro-phenyl)-7-chloro-1H-1,5-benzodiazepine-2,4-(3H,5H)-dione.

Example 36

Suppositories.—The suppository composition was compounded from the following ingredients:

| | Parts |
|---|---|
| 1 - methyl - 5 - (2'-chloro-phenyl)-7-chloro-1H-1,5-benzodiazepine - 2,4 - (3H,5H)-dione | 10.0 |
| Cocoa butter | 1690.0 |
| Total | 1700.0 |

Compounding procedure.—The finely powdered benzodiazepinedione compound was stirred, with the aid of an immersion homogenizer, into the cocoa butter which had previously been melted and cooled to about 40° C. The homogeneous mixture was then cooled to 35° C. and was poured into cooled suppository molds, each holding 1700 mgm. of the mixture. One suppository contained 10 mgm. of the benzodiazepinedione compound and, when administered by the rectal route to a warm-blooded animal of about 60 kg. body weight in need of such treatment, produced very good tranquilizing and anticonvulsive effects.

Analogous results were obtained when any one of the other benzodiazepinediones embraced by Formula I was substituted for the particular benzodiazepinedione in Examples 35 and 36. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

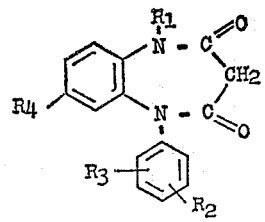

wherein $R_1$ is hydrogen, alkyl of 1 to 5 carbon atoms, hydroxyalkyl of 2 to 4 carbon atoms or di(alkyl of 1 to 4 carbon atoms) amino-alkyl of 2 to 4 carbon atoms,
$R_2$ is halogen, trifluoromethyl or methoxy,
$R_3$ is hydrogen, halogen, methyl or ethyl, and
$R_4$ is hydrogen, fluorine or chlorine.

2. A compound according to claim 1, wherein $R_1$ is hydrogen, alkyl of 1 to 3 carbon atoms, monohydroxyalkyl of 2 to 3 carbon atoms or dimethylamino-ethyl, $R_2$ is chlorine, bromine, fluorine, trifluoromethyl or methoxy, $R_3$ is hydrogen chlorine or methyl and $R_4$ is hydrogen, chlorine or fluorine.

3. A compound of the formula

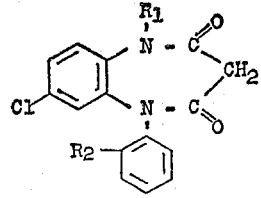

wherein $R_1$ is hydrogen, alkyl of 1 to 3 carbon atoms or dimethylaminoethyl, and
$R_2$ is chlorine, fluorine or trifluoromethyl.

4. A compound according to claim 3, which is 5-(2'-chloro - phenyl) - 7 - chloro - 1H - 1,5-benzodiazepine-2,4-(3H,5H)-dione.

5. A compound according to claim 3, which is 1-methyl - 5 - (2' - chloro-phenyl)-7-chloro-1H-1,5-benzodiazepine-2,4-(3H,5H)-dione.

6. A compound according to claim 3, which is 1-methyl - 5 - (2'-trifluoromethyl-phenyl)-7-chloro-1H-1,5-benzodiazepine-2,4-(3H,5H)-dione.

7. A compound according to claim 3, which is 1-methyl - 5 - (2' - fluoro-phenyl)-7-chloro-1H-1,5-benzodiazepine-2,4-(3H,5H)-dione.

8. A compound according to claim 3, which is 1-(dimethylamino - ethyl) - 5-(2'-fluoro-phenyl)-7-chloro-1H-1,5-benzodiazepine-2,4-(3H,5H)-dione.

References Cited

Buchi et al., "Helv. Chim. Acta.," vol. 39, pp. 957–965 (1956).

JOHN D. RANDOLPH, Primary Examiner

R. T. BOND, Assistant Examiner

U.S. Cl. X.R.

424—244; 260—471 R, 576

Disclaimer 3,711,509.—*Karl-Heinz Weber*, Gau-Algesheim, *Karl Zeile* and *Peter Danneberg*, Ingelheim am Rhein, *Rolf Giesemann*, Bingen, and *Karl Heinz Hauptmann*, deceased, late of Ingelheim am Rhein, Germany, by *Maria Hauptmann*, heir, Bonn (Rhine), Germany. 5-PHENYL-1H-1,5-BENZODIAZEPINE-2,4-(3H,5H)-DIONES. Patent dated Jan. 16, 1973. Disclaimer filed Sept. 13, 1972, by the assignee, *Boehringer Ingelheim G.m.b.H.*

Hereby disclaims the portion of the term of the patent subsequent to Aug. 14, 1989.

[*Official Gazette September 11, 1973.*]

UNITED STATES PATENT OFFICE
CERTIFICATE OF CORRECTION

Patent No. 3,711,509       Dated Jan. 16, 1973

Inventor(s) KARL-HEINZ WEBER, KARL ZEILE, PETER DANNEBERG, ROLF GIESEMANN and KARL HEINZ HAUPTMANN It is certified that error appears in the above-identified patent and that said Letters Patent are hereby corrected as shown below:

Col. 2, line 33, insert --(III)--.

Col. 4, line 75, correct "3'-methyl" to read --2'-methoxy--.

Col. 5, line 7, correct "methyl" to read --methoxy--;
line 15, correct the spelling of "formula".

Col. 6, line 19, correct "3" to read --3H--;
line 36, correct the spelling of "chloro".

Signed and sealed this 21st day of May 1974.

(SEAL)
Attest:

EDWARD M. FLETCHER, JR.
Attesting Officer

C. MARSHALL DANN
Commissioner of Patents